United States Patent [19]
Post, Sr.

[11] 3,776,193
[45] Dec. 4, 1973

[54] ANIMAL FEEDER

[76] Inventor: Robert L. Post, Sr., 3579 Rt. No. 46, Apt. 24A, Parsippany, N.J. 07054

[22] Filed: May 26, 1972

[21] Appl. No.: 257,361

[52] U.S. Cl. ............................. 119/51.5, 119/61
[51] Int. Cl. ............................................. A01k 5/00
[58] Field of Search ...................... 119/51.5, 61, 72, 119/74; 220/63, 65; 229/1.5 H

[56] References Cited
UNITED STATES PATENTS

| | | | |
|---|---|---|---|
| 730,082 | 6/1903 | Bates | 220/65 |
| 2,887,705 | 5/1959 | Serwer | 220/65 X |
| 3,076,435 | 2/1963 | Seymour | 119/61 X |
| 2,555,396 | 6/1951 | Cosner | 119/51.5 |
| 3,527,192 | 9/1970 | Ferrara | 119/61 |
| 2,029,429 | 2/1936 | Koons | 229/1.5 H |
| 2,427,697 | 9/1947 | Weidler | 229/1.5 H |
| 3,698,594 | 10/1972 | Boehlert | 119/61 X |
| 3,152,576 | 10/1964 | Faurot | 119/51.5 X |
| 3,498,268 | 3/1970 | Sleith et al. | 119/61 |
| 3,653,362 | 4/1972 | Davis | 119/61 |

Primary Examiner—Louis G. Mancene
Assistant Examiner—J. N. Eskovitz
Attorney—Bernard J. Murphy

[57] ABSTRACT

The feeder comprises a holder for food or water receptacles, in which the receptacles are of the disposable type. The holder is a pre-formed unit of plastic or similar construction having a conical recess for replaceably receiving a conical-shape receptacle, and has a locating key, of a dowel form, extending therefrom for the engagement thereof by an apertured handle which projects from one side of the disposable receptacle. The receptacle holder is hollow and has a filler plug threadedly fixed in a wall thereof to facilitate a weighting of the holder by the introduction of water, sand, and the like, and to effect a sealing of the water or sand weighting vehicle. A plurality of holders can be fixed together, in juxtaposition, by the means of bosses formed in a wall surface thereof, the bosses being configured to receive pin retainers which project from a decorative backboard.

5 Claims, 8 Drawing Figures

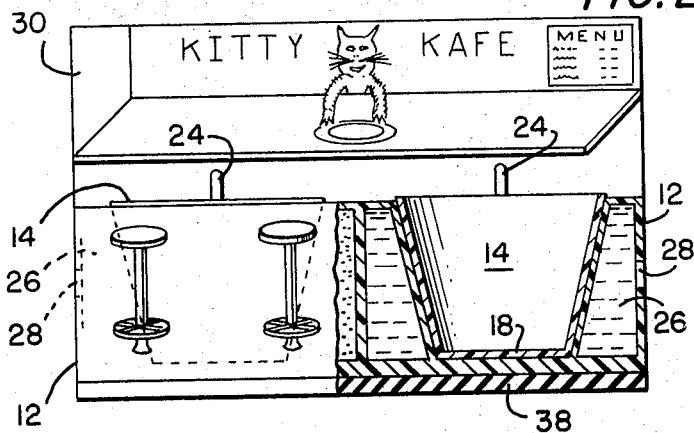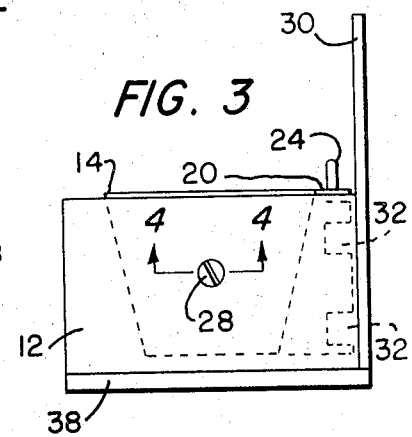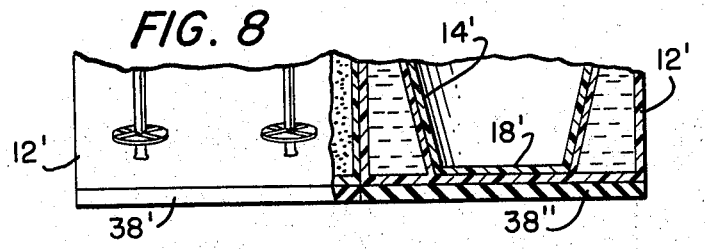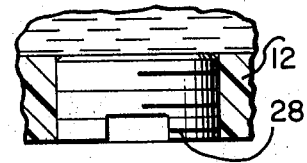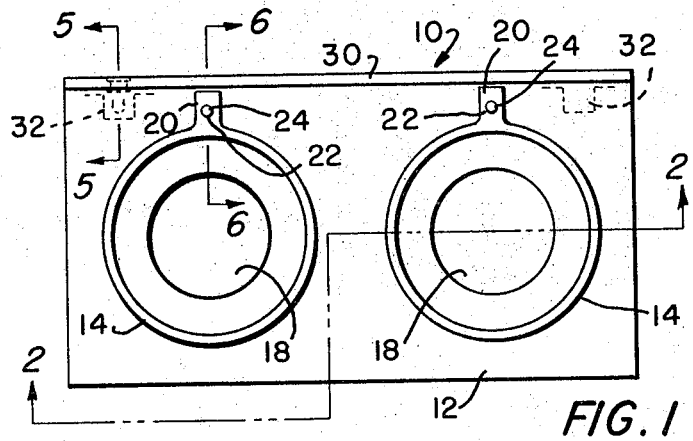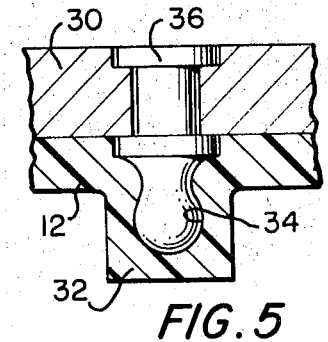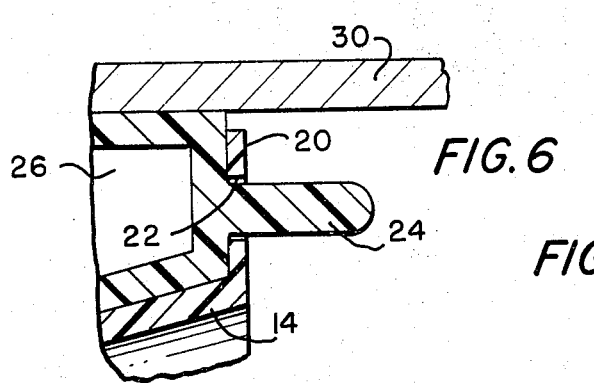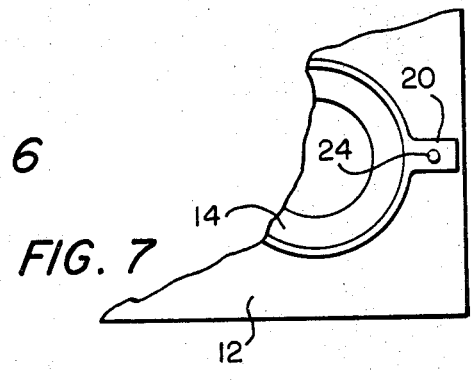

ANIMAL FEEDER

This invention pertains to animal feeders, and in particular to an animal feeder which comprises a receptacle holder and receptacles of the disposable type.

Disposable types of receptacles are known from the prior art, yet typically they are not used as animal feeders, and they own two disadvantages. For one, such receptacles, into which animal food or water would be placed, has no handle for gripping thereof by the animal's keeper. Now, animal food, however nutritious for the animal, commonly is greasy and odorous. The animal's keeper, after the animal has partaken of its meal, has to dispose of the receptacle and, in the process, almost necessarily has to place a thumb or index finger into the receptacle so that he might grasp it and carry it off for disposal. This ministration is distasteful. Of course, it is not unknown to feed an animal by using a handled utensil. However, on placing a handled utensil, a pot or the like, on the ground for an animal's feeding therefrom, the utensil moves across the ground — away from the animal as it tries to feed. Also, the utensil, the pot or whatever, can tip over and spill the contents.

Disposable, or "throw-away" types of receptacles are not uncommon, and holders for such are known. Yet, the combinations available on the market, or taught by prior art, comprise pre-formed, recessed containers which nest in recessed holders. These, however, provide no container or receptacle handle, by means of which the animal's keeper might grasp the receptacle without soiling his fingers. Further, the receptacles are free to gyrate within the recessed holders — to the frustration of the animal.

It is an object of this invention to set forth an improved animal feeder which owns none of the disadvantages of the prior art types. Specifically, it is an object of this invention to teach an animal feeder comprising first means for holding animal feed, water, and the like; second means for replaceably receiving said first means; wherein said first means comprises at least one recessed receptacle; said second means comprises at least one holder for a recessed receptacle; one of said first and second means has a key-type element extending therefrom; and the other of said first and second means has a key-way formed therein for engagement thereof with said key-type element for restraining said first and second means against relative rotary movement therebetween.

A feature of this invention comprises the setting forth of a conical-shape feed and water receptacle, of the disposable type, which has a handle forward thereon and which extends therefrom, said handle having an aperture therethrough, and a conically recessed holder for said receptacle, said holder having a keying dowel extending therefrom with which the handle aperture is replaceably engageable to inhibit relative rotary movement between said holder and said receptacle.

Further objects and features of this invention will become more apparent by reference to the following description, taken in conjunction with the accompanying figures, in which:

FIG. 1 is a top or plan view of an embodiment of the novel animal feeder, according to the invention;

FIG. 2 is a partial, vertical cross-sectional view of the feeder of FIG. 1 taken along section 2—2 of FIG. 1;

FIG. 3 is an end view of the feeder;

FIG. 4 is a partial cross-sectional view, taken along section 4—4 of FIG. 3, showing the filler plug detail;

FIG. 5 is an enlarged, fragmentary view, taken along section 5—5 of FIG. 1, depicting the attachment of the backboard to one of the receptacle holders;

FIG. 6 is an enlarged, fragmentary view, taken along section 6—6 of FIG. 1, depicting, in cross-section, the detail of the keyong post and the handle aperture of the receptacle;

FIG. 7 is a partial view, plan view, of an alternate embodiment of the novel animal feeder illustrative of an alternate arrangement for the keying post and handle aperture; and FIG. 8 is a fragmentary view, corresponding to FIG. 2, of an alternate embodiment of the novel feeder.

As shown in FIG. 1, the novel animal feeder 10 comprises a holder 12 having a recessed receptacle 14 replaceably disposed therein. FIGS. 2 and 6, in more detail, illustrate the nested disposition of the receptacle 14 within a recess 16 provided in the holder 12. The recess 16 and the receptacle 14 are formed as truncated cones, however this is arbitrary.

The receptacle 14 has a flat bottom 18 to facilitate its being placed on a flat surface during the preparation of the animal's meal therewithin, and has an extending handle 20 formed thereon. Handle 20 further has an aperture 22 formed therein for keying engagement thereof with an extending post or dowel 24 which is integral with and rises from a surface of the holder 12. The handle accommodates a facile handling of the receptacle 14, and the cooperation of the aperture 22 and dowel 24 frustate or inhibit a displacement of the receptacle 14 from its located disposition in the holder 12.

For illustrative purposes, the holder 12 is shown to be made of plastic material; other materials, however, may be equally suitable. The holder is hollow, having an annular chamber 26 formed therein. As shown in FIGS. 3 and 4, a threaded plug 28 is provisioned in a wall of the holder, closing an aperture thereat through which weighting material — i.e., sand, water, and the like — can be introduced. It is contemplated that the holder 12 will be merchandised without the weighting material, and the purchaser/user will use the plug 28 to charge the holder with the desired weighting material.

As shown in FIG. 2, a preferred embodiment comprises a pair of integral holders 12 — one to receive a feed receptacle 14, and one to receive a drinking water receptacle 16. In this arrangement, a backboard 30 is provided. The backboard is decorative, and intended, here, to render the animal feeder more attractive.

In FIG. 3 in phantom outline, and in FIG. 5 in enlarged detail, is shown the arrangement by means of which the backboard 30 and the holders 12 are replaceably secured together. Within a rear wall of each holder 12 are formed at least one pair of bosses 32. The bosses have bulbous recesses 34 formed therein for receiving a bulbous-ended pin 36 which is fixed, extendably, to the backboard 30. Very simply, the pins 36 are "snapped" into the recesses 34 to secure the backboard, at either ends thereof, to the holders 12. Preferably, the pins are of metal construction and, depending upon the material used in forming the holders 12, the recesses 34 can have hollow metal inserts fixed therewithin to prevent deterioration of the material of the bosses.

A rubber or like non-skid mat 38 is cemented in place on the bottom of the holders 12 to insure against the sliding thereof along a floor or similar feeding surface.

As it may be more convenient for the animal's keeper, an alternate embodiment of the invention contemplates the arrangement of the dowel 24 to an outer side of the holder 12. This is a matter of choice; it may be deemed preferrable to have the dowel 24 toward the rear, as shown in the first embodiment, where it will be less obstructive for the animal. The invention, of course, comprises either of these arrangements.

So also, my teaching extends to variations of the basic embodiments, which will occur to those skilled in the art to which the invention pertains, others benefiting from my disclosure.

For example, as illustrated in FIG. 8, the holders could be separated holders 12' to which separate mats 38' and 38'' are cemented, in order that individual holders 12' and receptacles 14' might be merchandised — initially, or as replacement units. In such an arrangement, then, the backboard 30 would serve a further purpose: that of securing the pair of separable holders 12' together in juxtaposition.

Of course, the pin 36 could be formed of, or could project from the holder 12 (or 12') to be received in a clasping recess in the backboard 30. Also, a keying element such as dowel 24 could be formed on the receptacle 14 and be locatingly receivable in an apertured or recessed boss formed in an upper wall of the holder 12 (or 12'). The weighting material — i.e., the water shown in one of the holders 12, and the sand shown in the other of the holders 12 — could be supplanted with other material, or it could be irreplaceably sealed within the holders.

Accordingly, while I have described my invention in connection with specific embodiments thereof, it is to be clearly understood that this is done only by way of example and not as a limitation to the scope of my invention as set forth in the objects thereof and in the appended claims.

I claim:
1. An animal feeder, comprising:
 first means for holding animal feed, water, and the like; and
 second means for replaceably receiving said first means; wherein
 said first means comprises at least one recessed receptacle;
 said second means comprises at least one recessed holder for a recessed receptacle;
 one of said first and second means has a key-type element extending therefrom; and
 the other of said first and second means has a keyway-type structure formed therein for engagement thereof with said key-type element for restraining said first and second means against relative movement therebetween; wherein
 said one recessed receptacle has a handle formed thereon to facilitate manipulation of said receptacle;
 said handle has an aperture formed therethrough, defining said keyway-type structure;
 said holder has a dowel-like element extending from a surface thereof, defining said key-type element, for receiving said aperture, upon said receptacle being disposed in said recessed holder;
 said holder has spaced-apart walls about the periphery thereof which define a closed chamber therewithin; and
 one of said walls has an aperture formed therein, and a plug replaceably secured in said wall aperture, to facilitate the charging of said chamber with weighting material.

2. An animal feeder, according to claim 1, wherein:
 said holder further has a pad fixed to an undersurface thereof, said pad being of non-skid material.

3. An animal feeder, according to claim 2, wherein:
 said first means comprises a plurality of recessed receptacles;
 said second means comprises a plurality of recessed holders for recessed receptacles; and further including
 means cooperative with said second means for securing said plurality of recessed holders together in juxtaposition.

4. An animal feeder, according to claim 3, wherein:
 said securing means comprises a backboard;
 said backboard and said holders of said plurality thereof have means replaceably and mutually engageable for securing said backboard and said holders together.

5. An animal feeder, according to claim 3, wherein:
 said securing means comprises a backboard;
 said backboard has pin means secured to and extending therefrom; and
 said holders of said plurality thereof each have socket-type recesses formed therein for replaceably receiving said pin means for arresting said backboard to said holders.

* * * * *